US008210440B1

(12) United States Patent
Pinai (10) Patent No.: US 8,210,440 B1
(45) Date of Patent: Jul. 3, 2012

(54) LOW-COST MAGNETIC STRIPE READER USING INDEPENDENT SWITCHING THRESHOLDS

(75) Inventor: Hoang Minh Pinai, Saratoga, CA (US)

(73) Assignee: IXYS CH GmbH (CH)

( * ) Notice: Subject to any disclaimer, the term of this patent is extended or adjusted under 35 U.S.C. 154(b) by 1007 days.

(21) Appl. No.: 12/221,161

(22) Filed: Jul. 31, 2008

(51) Int. Cl.
*G06K 19/06* (2006.01)
(52) U.S. Cl. .......................... 235/494; 235/487
(58) Field of Classification Search .................. 235/487, 235/494
See application file for complete search history.

(56) References Cited

U.S. PATENT DOCUMENTS

2005/0167496 A1* 8/2005 Morley et al. ................. 235/449
2007/0228279 A1* 10/2007 Matsumoto et al. ....... 250/336.1

OTHER PUBLICATIONS

U.S. Appl. No. 11/139,418, filed May 28, 2005, Chock et al.

Anadigm App Note 006, Applying the AN10E40 Magnetic Stripe Read Head Amplifier, 7 pages (Oct. 4, 2001).

* cited by examiner

*Primary Examiner* — Michael G Lee
*Assistant Examiner* — Matthew Mikels
(74) *Attorney, Agent, or Firm* — Imperium Patent Works; T. Lester Wallace; Darien K. Wallace (57) ABSTRACT

A F/2F waveform generator has a comparator and an analog multiplexer. In a low-cost magnetic card reader application, a magnetic track signal is amplified, filtered, and compared with a threshold signal to create a digital signal output. The analog multiplexer detects changes in state of the digital signal. When a change of state is detected, the analog multiplexer switches among dynamically tunable threshold signals. The selected threshold signal is used for comparison with the magnetic track signal. Switching level detection enables accurate F/2F waveform generation from relatively noisy magnetic track signals, thus improving the robustness of magnetic card readers. The analog implementation eliminates the need for expensive A/D conversion and processing and the design can be readily implemented in a very compact and low-cost package.

20 Claims, 7 Drawing Sheets

TYPICAL MAGNETIC STRIPE READER (PRIOR ART)

FIG. 1

TYPICAL SIGNAL PROCESSING STEPS (PRIOR ART)

FIG. 2

DIGITAL F/2F WAVEFORM GENERATOR
(PRIOR ART)

FIG. 3

ANALOG F/2F WAVEFORM GENERATOR
(PRIOR ART)

F/2F WAVEFORM GENERATOR CIRCUIT

F/2F WAVEFORM GENERATED USING SWITCHING LEVEL DETECTION

LOW-COST MAGNETIC STRIPE READER USING INDEPENDENT SWITCHING THRESHOLDS

TECHNICAL FIELD

The described embodiments relate to magnetic card readers, and more particularly to interface circuitry having raw magnetic track signal interfaces and associated functionality.

BACKGROUND INFORMATION

Figure 1:
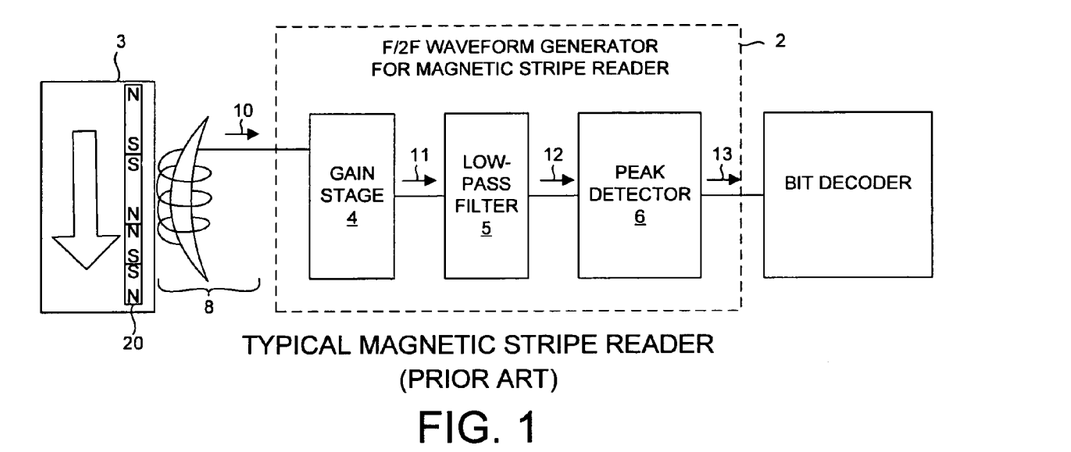
FIG. 1 (prior art) is a diagram illustrative of a prior art magnetic stripe reader of a type often employed in point of sale card reader devices.

FIG. 1 (prior art) is a simplified block diagram of a so-called magnetic stripe reader 1 as might be part of a common point of sale credit card terminal device. A card 3 encoded with a magnetic stripe 20, is physically swiped past a magnetic pick-up unit 8, generating a magnetic track signal 10. Typically, a F/2F waveform generator 2 then processes this magnetic track signal 10. This may occur by first amplifying the small amplitude magnetic track signal 10 using a gain stage 4 to generate an amplified track signal 11, then filtering the amplified track signal 11 using a low-pass filter 5 resulting in an amplified, filtered track signal 12. This signal is then processed by a peak detector 6 to produce a digital signal 13 that reflects the magnetic stripe 20 encoded on the card 3.

Figure 2:
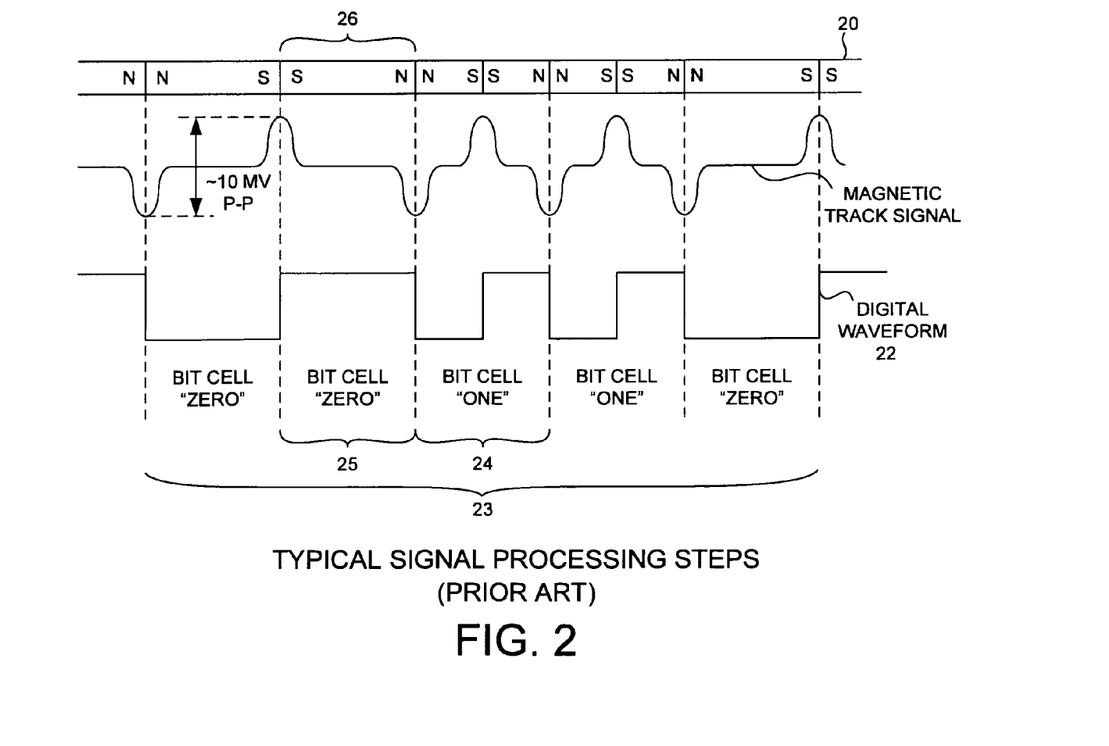
FIG. 2 (prior art) is a diagram illustrative of the common signal processing steps to translate an encoded magnetic stripe into a digital bit string used by a digital processor.

FIG. 2 (prior art) further details the signal processing steps performed by a magnetic stripe reader illustrated in FIG. 1. A typical card 3 is encoded with a magnetic stripe 20. This magnetic stripe is a series of magnetic pole pairs disposed end-to-end such that magnetic flux concentrations are linearly spaced along the magnetic stripe 20. A typical magnetic stripe 20 is linearly subdivided into a series of equal length bit cells 26 that represent a digital bit string 23. If one magnetic pole-pair is encoded across a single bit cell, this represents a zero bit 25. If two magnetic pole-pairs are encoded end-to-end across a single bit cell, this represents a one bit 24. Viewed over time, the signal is a sequential superposition of signals of a fixed frequency representing a zero bit and of signals of twice the fixed frequency representing a one bit. For this reason, the digital waveform 22 that results from reading typical magnetic cards is commonly termed a F/2F waveform. Furthermore, the elements used to transform a magnetic track signal into digital waveform 22 may be termed a F/2F waveform generator.

Figure 3:
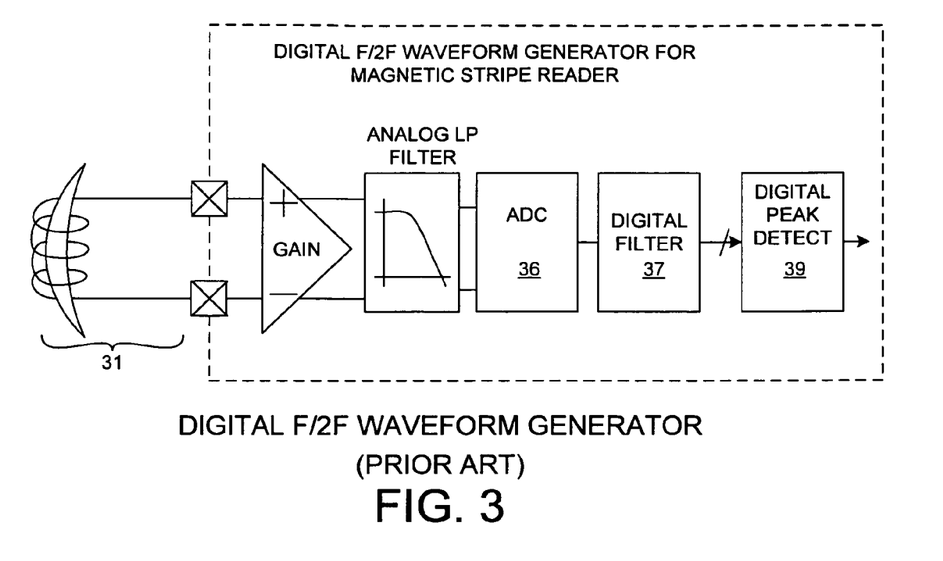
FIG. 3 (prior art) is a diagram illustrative of a prior art embodiment of a F/2F waveform generator for a magnetic stripe reader employing digital filtering and digital peak detection.

FIG. 3 (prior art) represents a first approach to F/2F waveform generation in magnetic stripe readers. The magnetic track signal from the magnetic pick-up unit 31 is amplified and low-pass filtered before the signal is digitized by an analog-to-digital converter 36. The digital signal may be further filtered by a digital filter 37 before being processed by a digital peak detector 39 to generate the F/2F waveform. The digital approach to F/2F waveform generation has several disadvantages. It is large and complex to implement on silicon, leading to high production cost. Furthermore, both the digital filtering and peak detection schemes require a significant and undesirably expensive software implementation effort.

Figure 4:
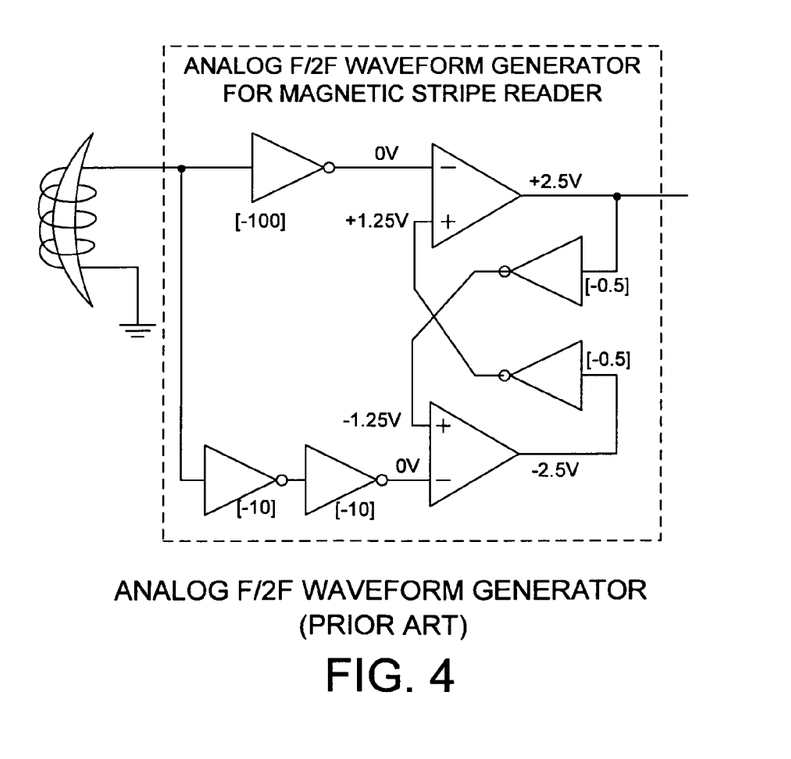
FIG. 4 (prior art) is a diagram illustrative of a prior art embodiment of a F/2F waveform generator for a magnetic stripe reader employing analog peak detection.

FIG. 4 (prior art) illustrates a second approach to F/2F waveform generation in magnetic stripe readers. The circuit switches between digital high and digital low output values when the magnetic track signal crosses predetermined threshold voltages. The threshold voltages are determined by the gain and operation of analog circuit components.

SUMMARY

A novel integrated circuit has a comparator, a signal amplifier, and an analog multiplexer. In one embodiment, the signal amplifier is a programmable inverting operational amplifier (PIOA) that supplies an amplified signal to the non-inverting input of the comparator. The comparator compares the amplified signal with a threshold signal present on the inverting input of the comparator. The digital output signal of the comparator is a control signal (a select input signal) that controls the analog multiplexer such that a change in state of the digital signal determines which one of a plurality of independently programmable voltages is coupled by the analog multiplexer to be the threshold signal present on the inverting input of the comparator.

In a magnetic stripe reader application, a magnetic track signal is supplied to the PIOA. A first programmable voltage source supplies the reference voltage signal for both the PIOA and the magnetic pick-up unit. A second programmable voltage source supplies a high threshold voltage signal to a first data input lead of the analog multiplexer. A third programmable voltage source supplies a low threshold voltage signal to a second data input lead of the analog multiplexer. An on-board processor controls the magnitude of the voltage signal supplied by each of the voltage sources and controls the gain and offset of the PIOA. The desired values for each of these parameters may be stored in on-board memory.

The comparator switches the state of the digital output when an amplified track signal first crosses a threshold voltage. By switching the threshold voltage between a high threshold voltage signal and a low threshold voltage signal, a large tunable hysteresis band is introduced in the detection scheme. This permits accurate peak detection from a noisy amplified track signal. By using programmable voltage sources, controlled by an on-board processor, the threshold levels may be dynamically tuned for each magnetic card reader application and/or each magnetic card swipe. Dynamic tuning permits optimal peak detection in the face of environmental noise. This may reduce the number of card misreads and may reduce the number of times a user must re-swipe the magnetic card to obtain a successful read. Furthermore, the use of analog components to implement the switching level detection scheme enables a particularly compact and low-cost integrated circuit implementation, thus enabling high performance peak detection in cost sensitive applications such as magnetic stripe readers.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 5:
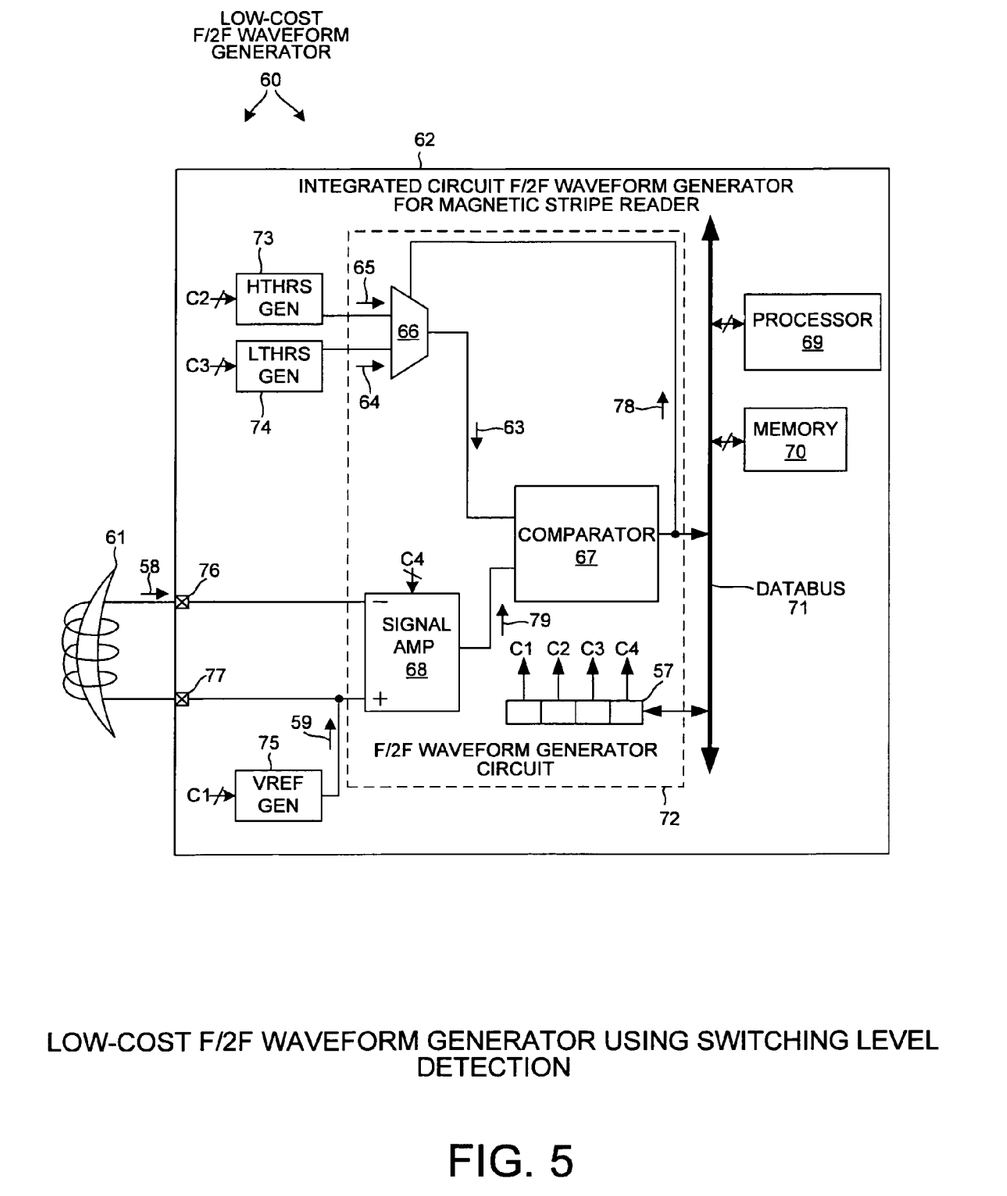
FIG. 5 is a diagram illustrative of a novel F/2F waveform generator.

FIG. 5 is a diagram illustrative of a low-cost F/2F waveform generator 60. F/2F waveform generator 60 includes a magnetic pick-up unit 61 and an integrated circuit 62. Magnetic pick-up unit 61 functions in a conventional way and as described in the background section of this patent document. Components 61 and 62 are typically fixed to a printed circuit board, and the printed circuit board is contained in a suitable enclosure (not shown) with access such that a magnetic stripe can engage magnetic pick-up unit 61.

In one embodiment, integrated circuit 62 includes a processor core 69, an amount of memory 70 (program and data memory such as, for example, FLASH and/or RAM), a databus 71, a first programmable internal reference voltage source 75, a second programmable internal reference voltage source 73, a third programmable internal reference voltage source 74, a plurality of terminals including analog input terminal 76 and reference terminal 77, an analog multiplexing circuit 66, a programmable inverting operational amplifier (PIOA) 68, and an analog comparator 67.

By writing appropriate control values into control register(s) 57, processor core 69 can configure and control blocks 73,74, 75, and 68 of integrated circuit 62. The lines labeled "C" in FIG. 5 represent the control values stored in the control register(s). For example, processor core 69 can set the magnitude of a reference voltage signal 59 output by the first programmable internal reference voltage source 75, can set the magnitude of a high threshold voltage signal 65 output by the second programmable internal reference voltage source 73, can set the magnitude of a low threshold voltage signal 64 output by the third reference voltage source 74, can set the gain of PIOA 68, and can set the input voltage offset of PIOA 68.

In one novel aspect, signal amplifier 68 amplifies a magnetic track signal 58 from a magnetic pick-up unit 61 connected to terminal 76. The resulting amplified track signal 79 is supplied to a comparator 67 where it is compared with a threshold signal 63. For example, if the amplified track signal 79 exceeds the threshold signal 63, then a digital high output signal 78 is generated by the comparator. Whereas, if the amplified track signal 79 is less than the threshold voltage signal 63, then a digital low output signal 78 is generated by the comparator. In a typical magnetic card reader application, the digital signal 78 is termed an F/2F waveform as described in the background section of this patent document. The value of digital signal 78 may be read by processor 69 via databus 71.

In another novel aspect, the comparator output lead is also connected to the control signal input lead of an analog multiplexer 66 that may select between a plurality of input signals, for example, a high threshold voltage signal 65 and a low threshold voltage signal 64. For example, if the comparator output signal is a digital high signal voltage, the analog multiplexer 66 selects the low threshold voltage signal as the output signal of the analog multiplexer 66. For example, if the comparator output signal is a digital low signal voltage, the analog multiplexer 66 selects the high threshold voltage signal as the output signal of the analog multiplexer 66. The output signal of the analog multiplexer 66 is the threshold voltage 63 which is compared with the amplified signal voltage 79.

Figure 6:
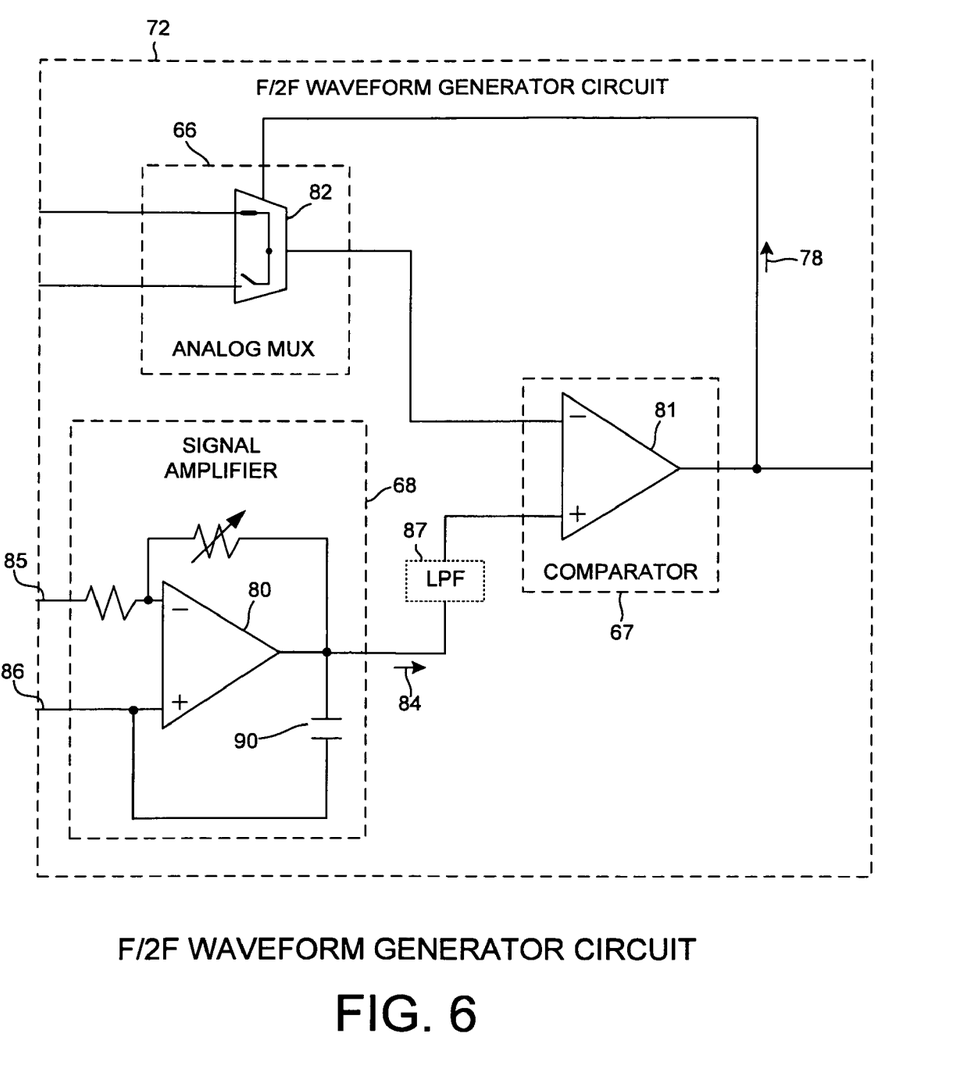
FIG. 6 is a diagram illustrative of a F/2F waveform generator circuit in accordance with one novel aspect.

FIG. 6 is a diagram illustrative of one embodiment of a novel F/2F waveform generator circuit 72. F/2F waveform generator circuit 72 includes a signal amplifier 68, a comparator 67, and an analog multiplexer 66. The signal amplifier 68 may be an inverting amplifier 80 with a programmable gain and offset. The inverting input lead receives the magnetic track signal 85. The non-inverting input receives a reference voltage signal 86 that may also be present on the return lead of magnetic pick-up unit 61. The output of the signal amplifier 68 is connected to the non-inverting input lead of analog comparator 81. The inverting input lead of analog comparator 81 is connected to the output lead of analog multiplexer 82. The output of the comparator 81 is digital signal 78. In a typical magnetic card reader application digital signal 78 is termed an F/2F waveform as discussed in the background section of this patent document.

In one embodiment (shown in FIG. 6), a capacitor 90, for example of 2.7 picofarads, couples the output signal 84 of the signal amplifier to reference voltage signal 86. This capacitor 90, for example, provides a first order roll-off at for example, 500 khz cut-off frequency to attenuate high frequency noise in the amplified track signal.

In another embodiment, an optional low-pass filter 87, either passive or active, of first order roll-off, or higher order roll-off is placed in the circuit between the output lead of the signal amplfier 80 and an input lead of the comparator 81 to attenuate high frequency noise in the amplified track signal. In another embodiment (not shown) signal amplifier 68 is a non-inverting amplifier with programmable gain and offset.

Figure 7:
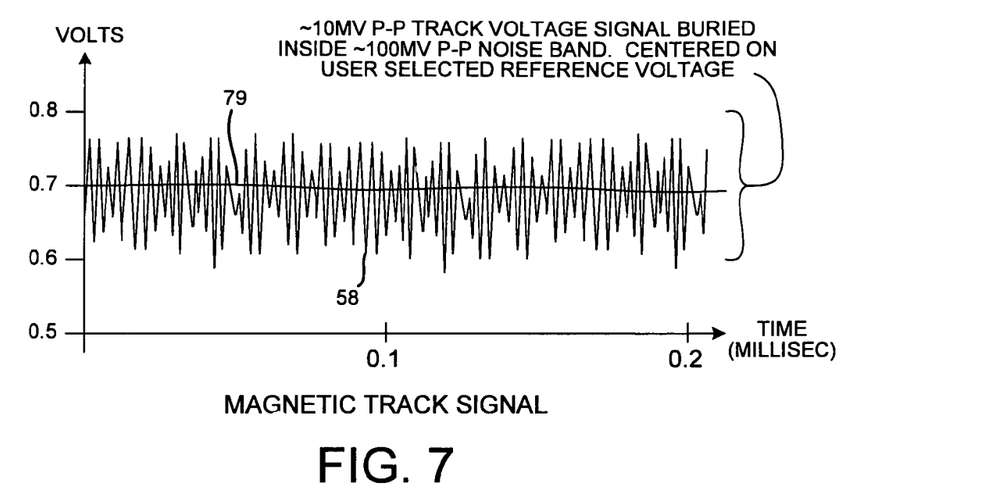
FIG. 7 is a waveform diagram illustrative of a magnetic track signal from a magnetic pick-up unit buried in larger amplitude, high frequency noise.

FIG. 7 is a waveform diagram illustrative of an amplified, magnetic track signal 79 extracted from a magnetic track signal 58 that is, encumbered with large amplitude, high frequency noise. For example, in a typical magnetic card reader application, the magnitude of a magnetic track signal is for example, ten millivolts peak-to-peak and the magnitude of a noise signal is for example, one hundred millivolts peak-to-peak.

Figure 8:
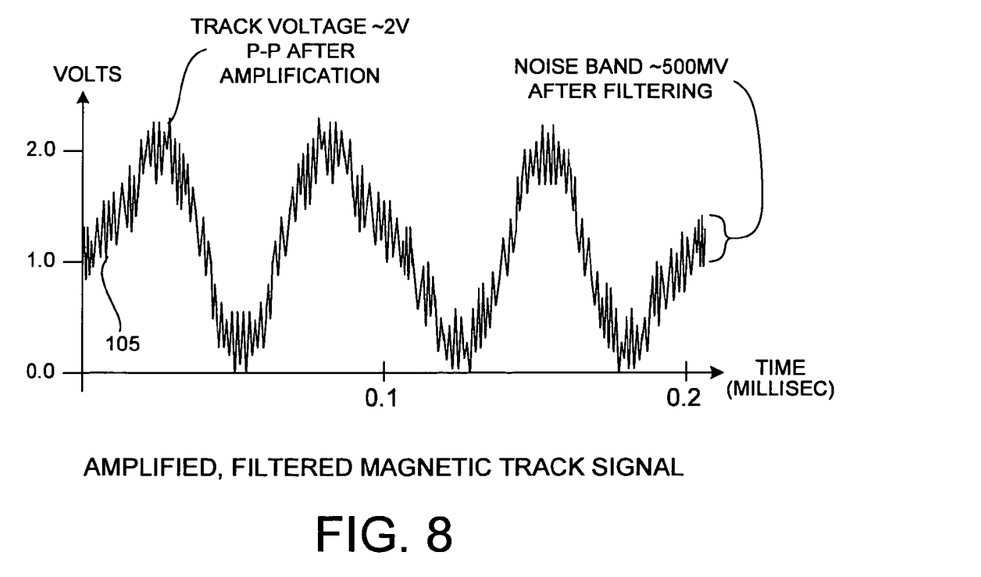
FIG. 8 is a waveform diagram illustrative of the signals of FIG. 7, except that in FIG. 8 the magnetic track signal has been amplified and the high frequency noise has been filtered such that the amplitude of the magnetic track signal exceeds that of the noise signal.

FIG. 8 is a waveform diagram illustrative of the signals of FIG. 7, except that in FIG. 8 the magnetic track signal has been amplified and the high frequency noise has been filtered such that the amplitude of the magnetic track signal is, for example, 2 volts peak-to-peak and the amplitude of the noise signal is, for example 500 millivolts.

Figure 9:
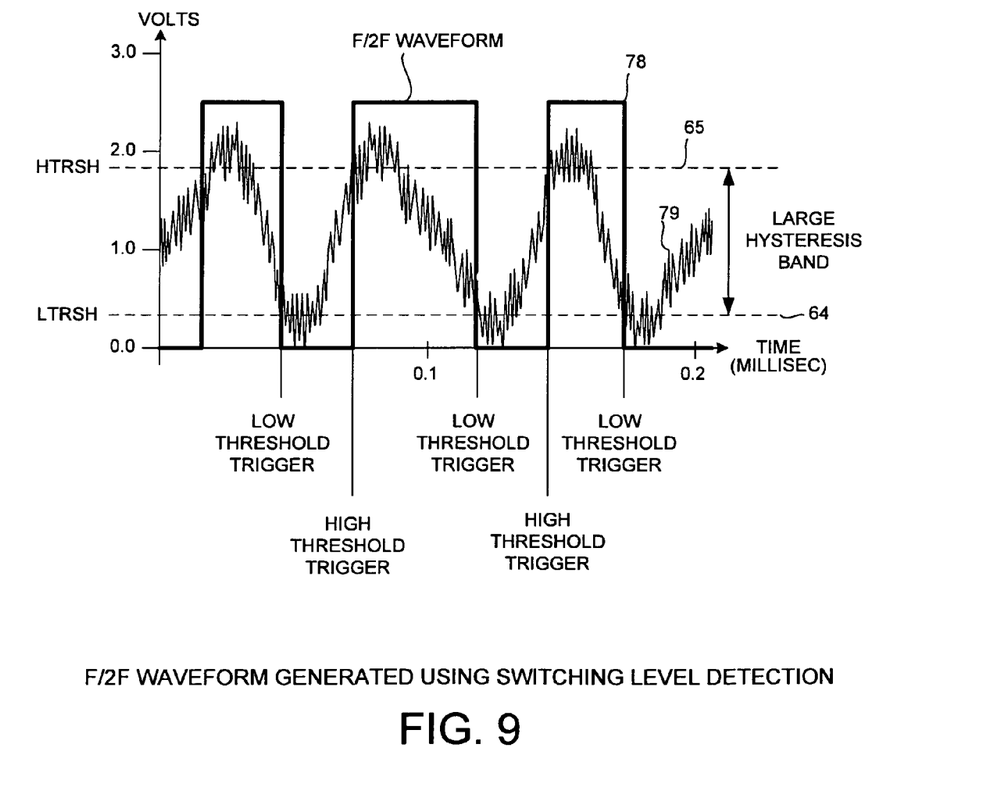
FIG. 9 is a waveform diagram illustrative of the signals of FIG. 8, except that FIG. 9 includes the F/2F waveform output of the F/2F waveform generator.

FIG. 9 is a waveform diagram illustrative of the signals of FIG. 8, except that FIG. 9 includes the F/2F waveform output of the F/2F waveform generator 78. The F/2F waveform remains at digital low voltage until the high threshold reference voltage signal 65 is crossed by the amplified track signal 79 and the F/2F waveform remains at digital high voltage until the low threshold reference voltage signal 64 is crossed by the amplified track signal 79.

In one novel aspect, the high threshold voltage signals and the low threshold voltage signals can be independently tuned to achieve a large amplitude, dynamically tunable hysteresis band. A hysteresis band is the voltage difference between a high threshold reference voltage signal 65 and a low threshold reference voltage signal 64 implemented at any particular time. For example a hysteresis band of 0.5 volts or greater may be generated. A large amplitude, dynamically tunable hysteresis band enables robust F/2F waveform generation in the face of an amplified track signal contaminated by noise. For example, the dynamic tuning of the threshold signals may be achieved by the processor 69 reading threshold values from memory 70 and writing those values to threshold voltage generators 73 and 74. In another example, processor 69 may process information regarding signal quality during a swipe and update the values of threshold voltage generators 73 and 74 to optimize read performance. In another example, there may be a plurality of voltage generators and the analog multiplexer 68 may select the threshold voltage signal 63 from a plurality of available voltage generators based on the particular card reader application or the conditions of a particular swipe.

Figure 10:
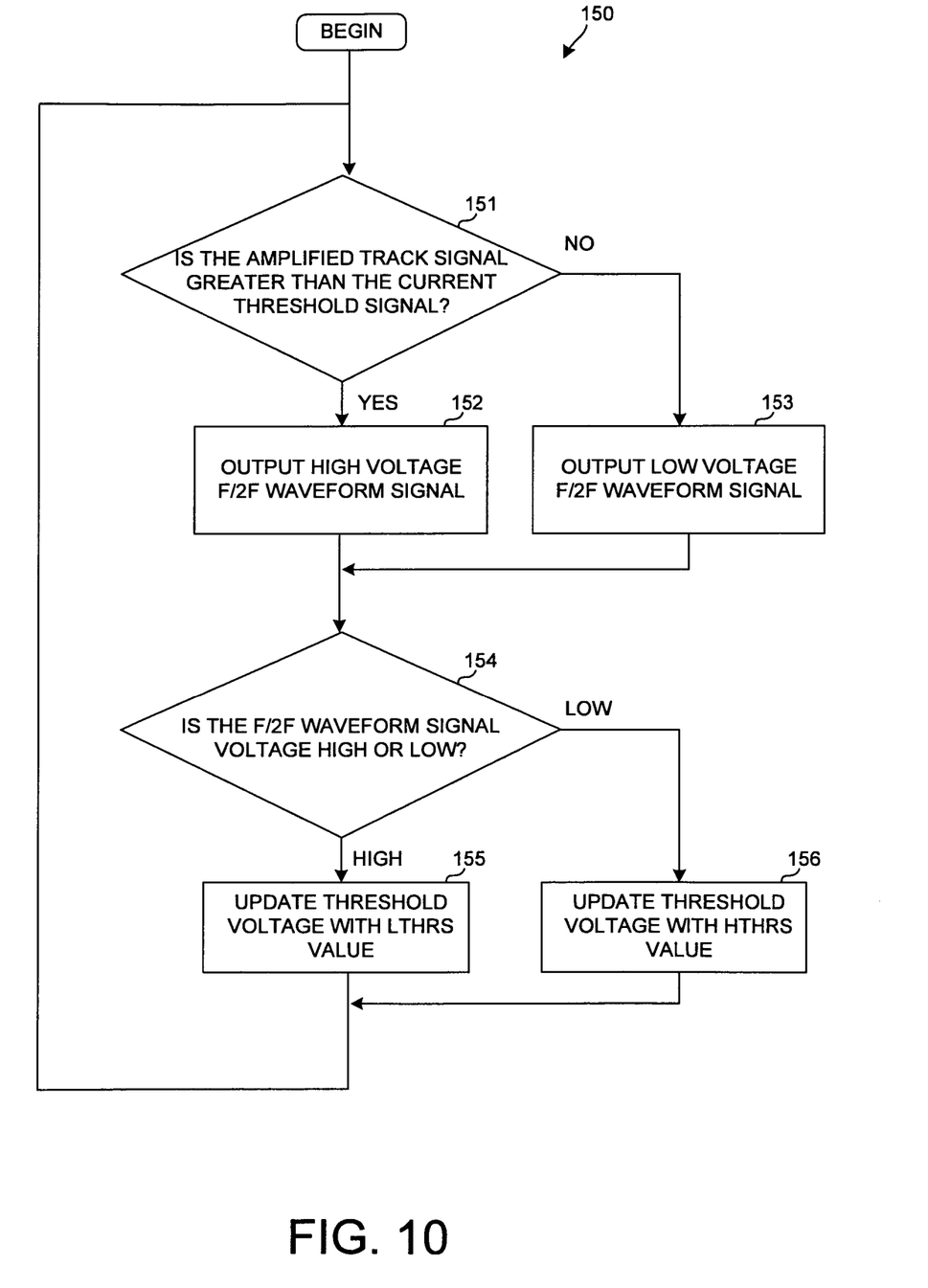
FIG. 10 is a simplified flowchart of a method of generating digital waveforms in accordance with the novel aspect of FIG. 6.

FIG. 10 is a flowchart of a method 150 where an amplified track signal is compared with the current threshold signal 151. If the amplified track signal is greater than the current threshold signal a digital high F/2F waveform signal is generated 152. If the amplified track signal is less than the current threshold signal a digital low F/2F waveform signal is generated 153. The resulting F/2F signal is then used to update the threshold voltage 154. If the F/2F waveform signal is digital high, then the threshold voltage is updated with a low threshold voltage signal value 155. If the F/2F waveform signal is digital low, then the threshold voltage is updated with a high threshold voltage signal value 156.

Although certain specific embodiments are described above for instructional purposes, the teachings of this patent document have general applicability and are not limited to the specific embodiments described above. Circuit 62 may be an amount of programmable logic of a field programmable gate array (FPGA) architecture. The overall F/2F waveform generator circuit of FIG. 6 has a smaller footprint than the prior art circuit of FIG. 3 that involves more components. It is therefore more cost effective to implement in production. In addition, the analog implementation of FIG. 6 with switching level detection with large amplitude hysteresis and dynamically tunable threshold voltages reduces the software development effort required to develop and tune the prior art circuit of FIG. 3, while maintaining robust peak detection in the face of noisy signals. As noise levels among different credit card applications vary widely, the flexibility to program the high and low reference threshold voltages independently increases card reader robustness. The overall component count of circuit 72 is lower than prior art FIG. 4, resulting in a simpler implementation and the dynamically tunable high and low threshold voltage references enable improved circuit tuning for specific credit card reader applications.

Although the novel integrated circuit is described above in connection with magnetic card reader applications, the integrated circuit sees general usage in signal detection applications, especially where a sensor output signal has a low amplitude desired signal contaminated by larger amplitude, high frequency noise and a digital output based on peak detection is required. Accordingly, various modifications, adaptations, and combinations of various features of the described embodiments can be practiced without departing from the scope of the invention as set forth in the claims.

What is claimed is:

1. An apparatus comprising:
   a signal amplifier having a first input lead that receives a magnetic track signal, a second input lead that receives a reference voltage signal, and an output lead that outputs an amplified track signal;
   a comparator having a first input lead coupled to the output lead of the signal amplifier, a second input lead, and an output lead that outputs a digital signal; and
   an analog multiplexer having a control signal input lead coupled to the output lead of the comparator, a first input lead that receives a high-threshold voltage signal, a second input lead that receives a low-threshold voltage signal, and an output lead coupled to the second input lead of the comparator.

2. The apparatus of claim 1, wherein the signal amplifier is an inverting operational amplifier.

3. The apparatus of claim 1, wherein the signal amplifier is a programmable inverting operational amplifier (PIOA), and wherein a control signal can change a gain of the PIOA by setting a control register value.

4. The apparatus of claim 1, further comprising:
   a capacitor coupled to the output lead of the signal amplifier and the reference voltage source.

5. The apparatus of claim 1, further comprising:
   a low-pass filter having an input lead coupled to the output lead of the signal amplifier and an output lead coupled to the first input lead of the comparator.

6. The apparatus of claim 1, further comprising:
   a first programmable internal reference voltage source that outputs the voltage reference signal coupled to the second input lead of the signal amplifier, wherein a first control signal can change the reference voltage signal;
   a second programmable internal reference voltage source that outputs the high threshold voltage signal coupled to the first input lead of the analog multiplexer, wherein a second control signal can change the high threshold voltage signal; and
   a third programmable internal reference voltage source that outputs the low threshold voltage signal coupled to the second input lead of the analog multiplexer, wherein a third control signal can change the low threshold voltage signal.

7. The apparatus of claim 1, wherein the digital signal is a F/2F waveform.

8. The apparatus of claim 1, wherein the high threshold voltage signal and the low threshold voltage signal differ by more than 0.5 volts.

9. A method comprising:
   amplifying a magnetic track signal thereby generating an amplified track signal;
   comparing the amplified track signal to a threshold signal thereby generating a digital signal; and
   using the digital signal to select which one of a plurality of programmable voltage sources is supplying the threshold signal, wherein a programmable inverting operational amplifier (PIOA) amplifies the magnetic track signal, and wherein a control signal changes a gain of the PIOA by setting a control register value.

10. The method of claim 9, further comprising:
    filtering the amplified track signal by coupling the amplified track signal to a reference voltage signal via a capacitor.

11. The method of claim 9, further comprising:
    filtering the amplified track signal with a low-pass filter.

12. A method comprising:
amplifying a magnetic track signal thereby generating an amplified track signal;
comparing the amplified track signal to a threshold signal thereby generating a digital signal;
using the digital signal to select which one of a plurality of programmable voltage sources is supplying the threshold signal;
using a first programmable internal reference voltage source to output a reference voltage signal to an input of a signal amplifier, wherein a first control signal changes the reference voltage signal;
using a second programmable internal reference voltage source to output a high threshold voltage signal to a first data input lead of an analog multiplexer, wherein a second control signal changes the high threshold voltage signal; and
using a third programmable internal reference voltage source to output a low threshold voltage signal to a second data input lead of the analog multiplexer, wherein a third control signal changes the low threshold voltage signal.

13. A method comprising:
amplifying a magnetic track signal thereby generating an amplified track signal;
comparing the amplified track signal to a threshold signal thereby generating a digital signal; and
using the digital signal to select which one of a plurality of programmable voltage sources is supplying the threshold signal, wherein the digital signal is a F/2F waveform.

14. The method of claim 9, wherein an analog multiplexer changes the threshold signal based on the digital signal.

15. An integrated circuit comprising:
an input terminal; and
means for storing a first programmable threshold voltage value and a second programmable threshold voltage value, for receiving a magnetic track signal from the input terminal, and for converting the magnetic track signal into a digital signal using hysteresis involving a first programmable threshold voltage determined by the first programmable threshold voltage value and involving a second programmable threshold voltage determined by the second programmable threshold voltage value, the first and second programmable threshold voltage values being independently programmable.

16. The integrated circuit of claim 15, wherein the means includes a control register that stores the first and second programmable threshold voltage values, a programmable internal voltage reference source that outputs the first programmable threshold voltage, a programmable internal voltage reference source that outputs the second programmable threshold voltage, an analog multiplexer that receives the first and second programmable threshold voltages, and a comparator that receives a signal from the analog multiplexer.

17. The integrated circuit of claim 15, wherein the means is also for executing instructions such that the first and second programmable threshold voltage values are moved from a memory and into the means.

18. The integrated circuit of claim 15, wherein the means includes an amplifier having a programmable gain.

19. The method of claim 9, wherein the plurality of programmable voltage sources includes a low threshold voltage source and a high threshold voltage source, and wherein if the digital signal is a digital high, then the low threshold voltage source supplies the threshold signal.

20. The method of claim 9, wherein the threshold signal has a voltage magnitude, further comprising:
dynamically setting the voltage magnitude by programming a control register.

* * * * *